United States Patent

[11] 3,628,028

| [72] | Inventor | Joseph O. Thorsheim<br>Minneapolis, Minn. |
| --- | --- | --- |
| [21] | Appl. No. | 709,669 |
| [22] | Filed | Mar. 1, 1968 |
| [45] | Patented | Dec. 14, 1971 |
| [73] | Assignee | Honeywell Inc.<br>Minneapolis, Minn. |

[54] WINDOW CLEANING APPARATUS FOR PHOTOMETRIC INSTRUMENTS
3 Claims, 4 Drawing Figs.

| [52] | U.S. Cl. | 250/218, 250/239 |
| --- | --- | --- |
| [51] | Int. Cl. | G01n 21/26 |
| [50] | Field of Search | 356/207, 208; 250/218, 239; 340/237 |

[56] References Cited
UNITED STATES PATENTS

| 1,937,722 | 12/1933 | Simon et al. | 356/207 |
| --- | --- | --- | --- |
| 2,650,562 | 9/1953 | Bonar et al. | 356/207 X |
| 3,060,318 | 10/1962 | Ouvrard | 250/218 |
| 3,251,999 | 5/1966 | Middleton et al. | 250/218 |

Primary Examiner—Walter Stolwein
Attorneys—Lamont B. Koontz, Francis A. Sirr and Oliver F. Arrett ABSTRACT: An apparatus for use in photometric instruments is described in which conditioning of the gaseous sample under study is unnecessary. No filters, condensers, sample heaters, vapor traps or detector heaters are used. A curtain of clean air over the radiation source and radiation detector windows protects them from condensate or particulate matter in the sample and provides a fixed radiation path length.

Patented Dec. 14, 1971 3,628,028
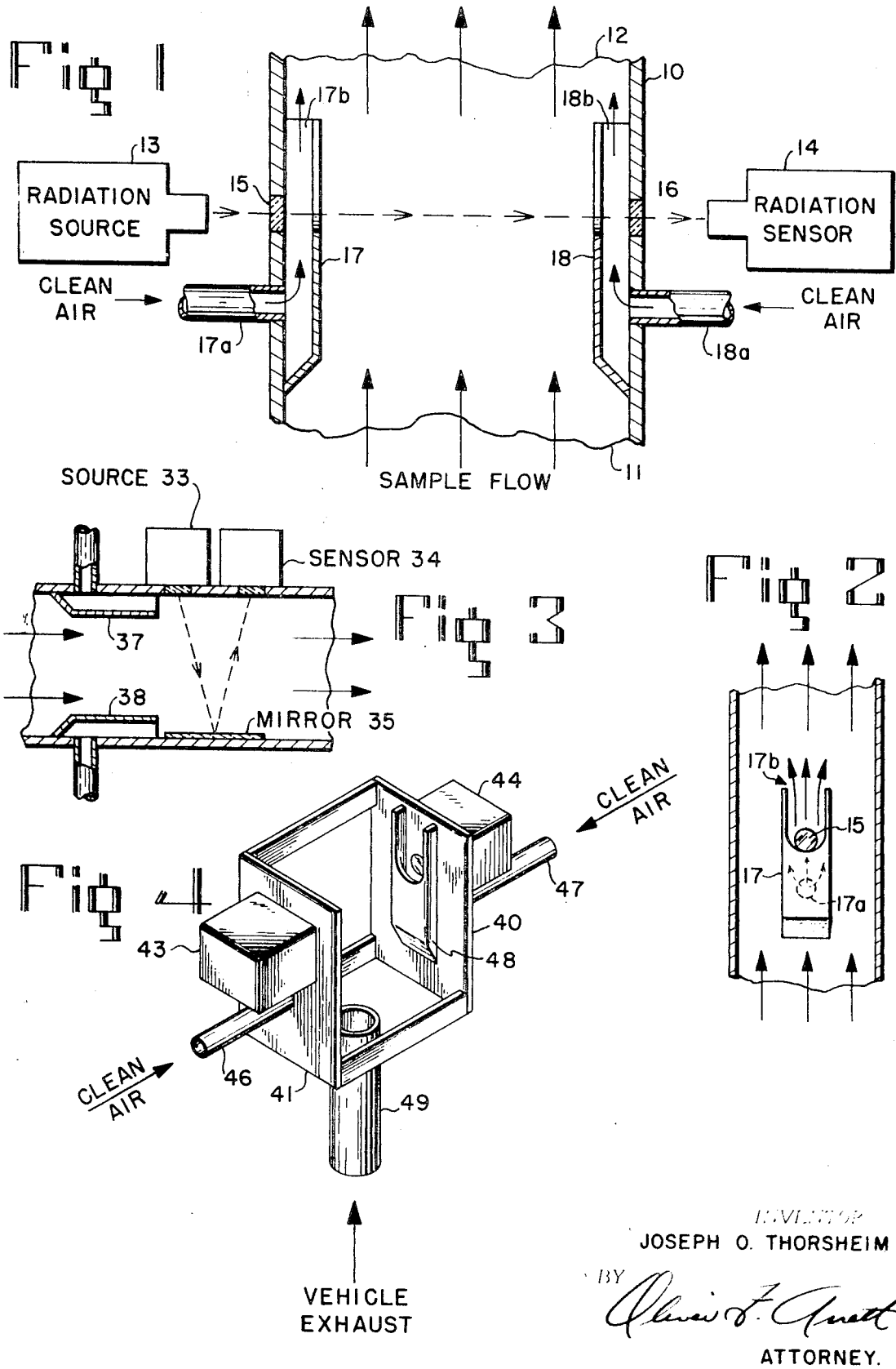
INVENTOR
JOSEPH O. THORSHEIM
BY
ATTORNEY.

3,628,028

WINDOW CLEANING APPARATUS FOR PHOTOMETRIC INSTRUMENTS

BACKGROUND OF THE INVENTION

This invention relates generally to the field of photometric analysis wherein an effect on radiation passing through the sample medium under study is taken to be indicative of the presence, and in some cases the amounts, of certain constituents therein. The term "study" is to be taken in a broad sense as meaning: measuring, analyzing either qualitatively or quantitatively, sensing, monitoring, detecting or the like. The term "sample medium" primarily includes gases, vapors, air, mixtures thereof, fluids generally, and particulate suspensions in any of the foregoing. The invention is therefore related to the fields of photometry and spectrophotometry generally and to the many analytical instruments making use of radiation. Such instruments find general use for example in air pollution control, such as measuring smoke in smokestacks, vehicle exhaust analysis, and fire detection.

Specifically, the invention relates to an improvement for maintaining the optical apparatus associated with such instruments in an accurate and operable condition. A major problem in such instrumentation is the conditioning of the sample to be studied in order to prevent obscuration of the optical path from radiation source to radiation sensor. Obscuration usually occurs at the protective windows associated with the source and sensor. A wide variety of approaches have been used to alleviate this problem. Filters have been used to remove particulate matter, condensers and condensate traps have been used to remove the condensibles. Attempts have been made to prevent condensation by the addition of heaters in the sampling region or chamber and in the radiation source and radiation sensor proper. Such attempts not only increase the manufacturing expense of the instruments but require periodic maintenance for emptying condensate traps, changing filters, and the like. Furthermore, the removal of condensibles and particulate matter may remove some of the constituents which are to be studied in the sample.

SUMMARY OF THE INVENTION

By means of the present invention, an unchanged sample may be brought into the optical path of the photometric instrument because the windows are protected by means of a curtain of flowing inert fluid. The term "inert" means that the fluid must not react with the sample under study, absorb undue amounts of radiation or change in composition in such a way as to interfere with the overall instrument operation. The fluid is preferably a gas and will be described as such hereinafter.

The invention will be described in connection with an ultraviolet absorption photometer used for measuring the amount of particulate matter and burned and unburned hydrocarbons contained in the exhaust of a combustion engine although it is not limited thereto. The invention is also described in connection with the use of ultraviolet radiation although it is not limited thereto since infrared radiation and the visible wavelengths may also be used. In the case of hydrocarbon detection, ultraviolet radiation is preferred. In spectrophotometry, infrared radiation may be preferred. In the detection of smoke, visible radiation may be preferred in some instances.

Ultraviolet absorption photometers typically include a region or chamber for at least momentarily containing the sample to be studied, a source of ultraviolet radiation and an ultraviolet radiation sensor. The radiation is passed through a first transparent window, then through a predetermined path in the sample and finally through a second transparent window to the sensor. Since the interior parts of the windows are directly exposed to the sample under study, these parts of the optical system tend to become progressively obscured by the deposition of condensibles and the like as previously discussed. The obscuration not only reduces the amount of radiation entering and leaving the sample region but also modifies the path length of the radiation therethrough. Both of these effects are undesirable since they affect the accuracy of the instrument.

It is an object of this invention to provide an apparatus for use with photometric instruments generally and particularly with instruments of the type described immediately above, which apparatus is capable of maintaining the windows in a substantially clean condition and providing a fixed path length for the radiation. This and other objects are achieved by providing a relatively thin laminar flow of the inert gas over the windows thereby separating the windows from the sample under study. The laminar flow of inert gas prevents the obscuration of the windows, and provides a protective cushion of air over each window which results in a fixed path length for the radiation between the radiation source and the radiation sensor.

BRIEF DESCRIPTION OF THE DRAWING

FIG. 1 is a schematic sectional view of an instrument utilizing the apparatus of this invention;

FIG. 2 is a fragmentary view of a portion of the instrument of FIG. 1 showing a portion of the apparatus in greater detail; and FIG. 3 is a schematic drawing of another embodiment of the invention.

FIG. 4 is a schematic drawing of yet another embodiment of the invention.

DESCRIPTION OF THE PREFERRED EMBODIMENT

A typical instrument using the apparatus of this invention is shown in FIG. 1 and consists of a duct or chamber 10 including inlet and outlet openings 11 and 12, respectively, through which a sample is allowed to flow or through which it may be drawn by a suitable pumping arrangement (not shown). An ultraviolet radiation source 13, such as an argon lamp, and an ultraviolet radiation detector 14, such as the detector described in U.S. Pat. No. 3,344,302, are positioned in spaced relationship to provide a predetermined path for the radiation through the sample contained in duct 10. Located between the two opposing walls of duct 10 are a pair of windows 15 and 16 which are ultraviolet transparent, such as quartz or Corning 9741 glass. Associated with each window is a conduit means 17 and 18, respectively, including inlets 17a and 18a and outlets 17b and 18b. Conduit means 17 and 18 are shaped to discharge a relatively thin laminarlike flow of inert gas, which may be merely clean air if the sample is engine exhaust or smoke, out of the conduit and across each window. The conduit means is preferably positioned near the upstream side of the windows, that is, between the windows and duct inlet 11 so that the inert gas flows in the same direction as the sample through duct 10. The shape of the conduit means is better shown in FIG. 2. Of course, the specific shape shown is not the only shape which will provide a thin laminar flow across the windows. Many shapes will be readily apparent to those of ordinary skill in the art. The only essential requirement to be fulfilled by any shape used is that the inert gas flow across the windows and downstream of the radiation before mixing with the sample so as to avoid interference therewith.

In operation, the sample absorbs ultraviolet radiation in proportion to the concentration of the ultraviolet absorbing, scattering or reflecting constituents it contains thus affecting the amount of radiation sensed by radiation sensor 14. This type of operation is well known in the art and will not be discussed in detail.

During operation, the flow of inert gas through conduit means 17 and 18 shields windows 15 and 16 from the constituents in the sample which might cause obscuration. The inert gas should be substantially transparent to the radiation utilized although complete transparency is not necessary. In the case of ultraviolet radiation and the study of engine exhausts, ordinary ambient air has been found to be very satisfactory. The flow of the inert gas may be caused by a pump (not shown) or in the alternative, if the sample is flowing through the duct at a fairly high-flow rate, the inert gas may be automatically aspirated into conduit means 17 and 18.

As can be seen in FIG. 1, conduit means 17 and 18 also provide the additional function of establishing a fixed path length for the radiation through the sample by means of the protective cushion of inert gas flowing over each window during operation.

Referring to FIG. 3, another embodiment is shown making use of an increase in the optical path length to increase sensitivity. This is accomplished by increasing the distance between the radiation source 33 and the radiation sensor 34 as shown. A reflective means 35, such as a mirror is shown opposite the source and sensor to reflect the radiation from the source back across duct 30 to the sensor. In this embodiment, source 33 and sensor 34 are protected by one conduit means 37 while reflective means 35 is protected by conduit means 38.

The instrument of FIG. 4 shows that a closed duct for studying the sample is not necessary. As shown, this embodiment consists of a pair of plates 40 and 41 which respectively carry the radiation source 43 and radiation sensor 44. The plates also carry on the insides thereof the conduit means, one of which may be seen in the figure and indicated as 48. These plates may be positioned opposite each other in proximity to the exhaust pipe 49 of a vehicle in order to measure the hydrocarbon content or particulates, such as smoke, therein by means of radiation absorption. For example, on a diesel truck having a vertical exhaust, the positioning of the two plates in proximity to the upper end of the exhaust and in substantial opposition with respect to each other has been found to provide a satisfactory sample flow for operation of the instrument. The flow of clean ambient air through the conduit inlet means 46 and 47 provides the desired results in accordance with this invention. As shown, brackets may be utilized to provide a fixed spatial relationship between the two plates 40 and 41 if desired.

A wide variety of tests have been run on instruments utilizing this invention. These tests indicate that the windows are kept clean without the use of condensers, water traps filters and without their requisite maintenance.

For example, an instrument similar to that shown in FIG. 1 was tested for 12 minutes on a Chevrolet engine running with the choke closed to produce maximum smoke. After a 12-minute test the windows were clean. There was no evidence of soot or condensation of any kind.

Tests were also run on a 1965 Chrysler on a dynomometer. The tests consisted of an idle for 10 seconds, gradual acceleration to 30 miles per hour, deceleration to 15 miles per hour, acceleration to 50 miles per hour and deceleration to 20 miles per hour. This test was followed by two tests of acceleration to 45 miles per hour, held for 10 seconds and deceleration. After these tests the windows were clean although the sample duct proper was completely black with soot.

Other tests were run on a Hercules four cylinder, 29 horsepower diesel engine. The engine ran many times over a 3-day period. The exhaust produced obscuration as high as 95 percent per foot during these tests. However, the windows in the instrument remained clean and operable for the entire 3-day period.

Form the above description of the invention, it is apparent that persons having ordinary skill in the art will be enabled to construct and operate a wide variety of apparatus utilizing this invention. The invention should therefore not be limited to the specific embodiments described herein.

The embodiments of the invention in which an exclusive property or right is claimed are defined as follows:

1. Apparatus for photometric instruments comprising, wall means defining a space through which a fluid sample may flow, a window in said wall, means for admitting an inert gas through said wall means upstream of said window with respect to sample flow, conduit means extending along said wall means between said inert gas source and said window and confining gas flow to a thin area along said wall means and discharging inert gas in thin laminar flow over said window, the flow continuing substantially parallel to said wall means to a point beyond said window downstream of sample flow.

2. Apparatus according to claim 1 in which said wall means has two windows in the wall means together with a radiation source associated with one window and a radiation sensor associated with the other window.

3. Apparatus according to claim 2 in which said wall means has two parallel spaced wall surfaces with said two windows oppositely disposed therein across the sample flow space.

* * * * *